US012790219B2

(12) United States Patent
Kato et al.

(10) Patent No.: US 12,790,219 B2
(45) Date of Patent: Nov. 10, 2026

(54) CARBON MATERIAL, METHOD FOR PRODUCING CARBON MATERIAL, METHOD FOR PRODUCING SPHERICAL CARBON MATERIAL, METHOD FOR PRODUCING COMPOSITE CARBON MATERIAL, AND METHOD FOR MANUFACTURING SECONDARY BATTERY

(71) Applicant: Mitsubishi Chemical Corporation, Tokyo (JP)

(72) Inventors: Akihiro Kato, Tokyo (JP); Nobuyuki Ishiwatari, Tokyo (JP); Hisako Kondo, Tokyo (JP); Hirofumi Fukuchi, Tokyo (JP); Masakazu Yokomizo, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 430 days.

(21) Appl. No.: 18/581,205

(22) Filed: Feb. 19, 2024

(65) Prior Publication Data

US 2024/0270579 A1 Aug. 15, 2024

Related U.S. Application Data

(63) Continuation of application No. PCT/JP2022/031235, filed on Aug. 18, 2022.

(30) Foreign Application Priority Data

Sep. 10, 2021 (JP) ................................ 2021-148060

(51) Int. Cl.

| | |
|---|---|
| ***H01M 4/58*** | (2010.01) |
| ***C01B 32/21*** | (2017.01) |
| ***H01M 4/1393*** | (2010.01) |
| *H01M 4/02* | (2006.01) |

(52) U.S. Cl.

CPC ........... *C01B 32/21* (2017.08); *H01M 4/1393* (2013.01); *C01P 2002/72* (2013.01); *C01P 2004/51* (2013.01); *C01P 2006/11* (2013.01); *C01P 2006/12* (2013.01); *C01P 2006/40* (2013.01); *H01M 2004/027* (2013.01)

(58) Field of Classification Search

CPC ............... H01M 4/133; H01M 4/1393; H01M 2004/027; C01B 32/21; C01P 2002/72; C01P 2004/51; C01P 2006/11; C01P 2006/12; C01P 2006/40

See application file for complete search history.

(56) References Cited

U.S. PATENT DOCUMENTS

| | | | | |
|---|---|---|---|---|
| 6,632,569 | B1 | 10/2003 | Kameda et al. | |
| 2011/0171532 | A1 * | 7/2011 | Okanishi | C01B 32/205 252/502 |
| 2017/0187041 | A1 | 6/2017 | Yamada et al. | |
| 2019/0273248 | A1 | 9/2019 | Yamada et al. | |
| 2021/0135220 | A1 * | 5/2021 | Isaka | H01M 10/0525 |
| 2021/0184217 | A1 * | 6/2021 | Yamada | H01M 4/625 |

FOREIGN PATENT DOCUMENTS

| | | | |
|---|---|---|---|
| CN | 106663808 | A | 5/2017 |
| CN | 110024189 | A | 7/2019 |
| JP | 2000-340232 | A | 12/2000 |
| JP | 2013 196842 | A | 9/2013 |
| JP | 2014-114197 | A | 6/2014 |
| JP | 2016-189319 | A | 11/2016 |
| JP | 2017-126425 | A | 7/2017 |
| JP | WO 2018/097212 | A1 | 5/2018 |

OTHER PUBLICATIONS

International Search Report issued Oct. 18, 2022 in PCT/JP2022/031235 filed Aug. 18, 2022, 2 pages.
Korean Office Action issued May 8, 2026 in Korean Patent Application 10-2024-7004062 (with English Machine Translation), 19 pages.
Combined Taiwanese Office Action and Search Report issued Jan. 15, 2026 in Taiwanese Patent Application No. 111133704 (with unedited computer-generated English translation), 10 pages.
Extended European Search Report issued Feb. 19, 2025 in European Patent Application No. 22867163.2 citing document No. 15 therein, 9 pgs.

* cited by examiner

*Primary Examiner* — Raymond Alejandro
(74) *Attorney, Agent, or Firm* — Oblon, McClelland, Maier & Neustadt, L.L.P.

(57) ABSTRACT

A carbon material comprising natural graphite, wherein the carbon material satisfies the following formulas (1) and (2), $$y \geq 0.23x + 3.1 \quad (1)$$

$$z \geq 0.43 \quad (2)$$

wherein x is d50 (μm) of the carbon material, y is d90/d10 of the carbon material, and z is the tap density (g/cm$^3$).

13 Claims, 1 Drawing Sheet

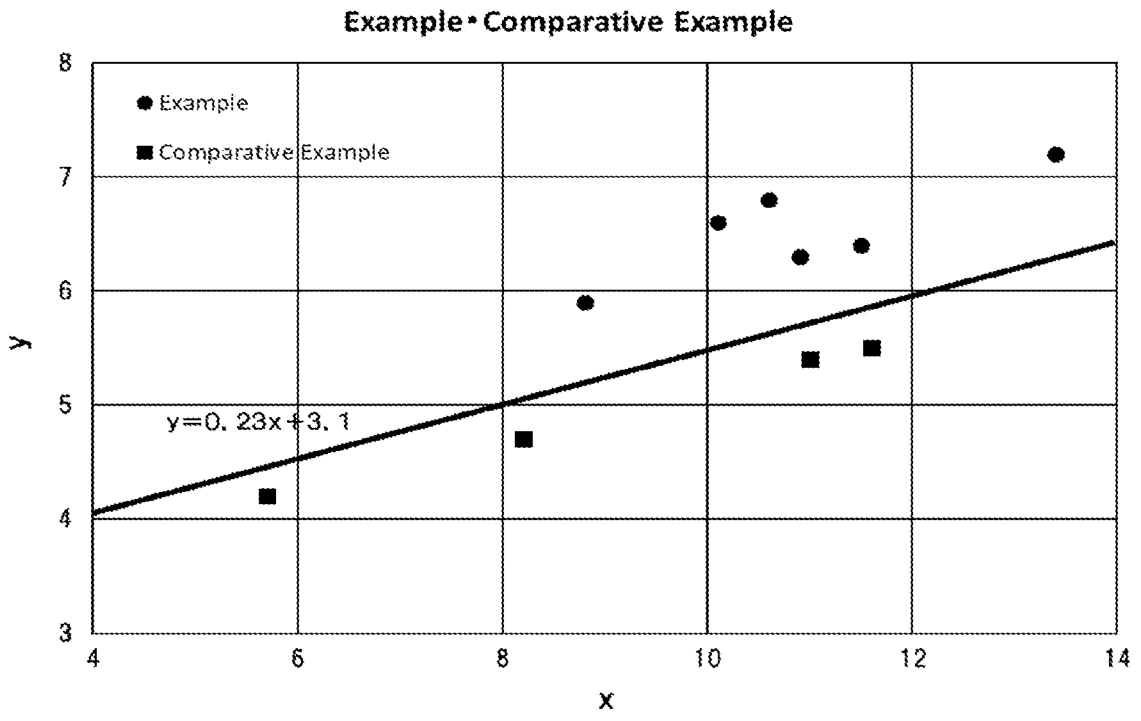
Example・Comparative Example
Example
Comparative Example
y=0. 23x+3. 1
8
7
6
5
4
3
4
6
8
10
12
14
x
y

CARBON MATERIAL, METHOD FOR PRODUCING CARBON MATERIAL, METHOD FOR PRODUCING SPHERICAL CARBON MATERIAL, METHOD FOR PRODUCING COMPOSITE CARBON MATERIAL, AND METHOD FOR MANUFACTURING SECONDARY BATTERY

CROSS REFERENCE TO RELATED APPLICATIONS

This application is a continuation of PCT/JP2022/031235, filed on Aug. 18, 2022, and claims priority to JP Patent Application No. 2021-148060, filed on Sep. 10, 2021, the entire contents of which are incorporated herein by reference.

TECHNICAL FIELD

The present invention relates to a carbon material, a method for producing the carbon material, a method for producing a spherical carbon material, a method for producing a composite carbon material, and a method for manufacturing a secondary battery including the composite carbon material.

BACKGROUND ART

In the past, there has been a growing demand for large-capacity secondary batteries with reductions in the sizes of electronic devices. Particular attention has been given to lithium-ion secondary batteries, which have higher energy densities and superior high-current charging and discharging characteristics than nickel-cadmium batteries or nickel-hydrogen batteries.

In the past, increasing the capacity of lithium ion secondary batteries has been widely studied.

In recent years, there has been an increasing demand for even higher performance for lithium ion secondary batteries. For this reason, there is a need for lithium ion secondary batteries to achieve even higher capacity, higher input/output, and longer life.

Regarding lithium ion secondary batteries, it is known to use carbon materials such as graphite as the negative electrode active material. Among them, when graphite having a high degree of graphitization is used as a negative electrode active material for a lithium ion secondary battery, a capacity close to 372 mAh/g, which is the theoretical capacity for lithium absorption of graphite, can be obtained. Graphite is also known to be preferable as an active material for negative electrodes because it is excellent in cost and durability.

When an active material layer containing a negative electrode material is densified to increase capacity, the following problems occur due to destruction and deformation of the material:

increase in irreversible charge/discharge capacity during initial cycling;

decrease in large current charge/discharge characteristics; and deterioration of cycle characteristics.

In order to solve the above problem, for example, Patent Literature 1 discloses a technique for producing spherical natural graphite by subjecting flaky natural graphite to mechanical energy treatment.

Patent Literature 2 discloses a method for obtaining spherical graphite particles having smooth particle surfaces by adding a resin binder to raw graphite particles and subjecting them to spheronization treatment.

Patent Literature 3 discloses a method for obtaining spheroidized graphite particles having excellent spheronization efficiency by spheronizing a flake-like, scale-like, or block-like carbon material.

Patent Literature 1: JP 2000-340232 A

Patent Literature 2: JP 2014-114197 A

Patent Literature 3: JP 2017-126425A

According to studies by the present inventors, when the spheroidized graphite particles disclosed in Patent Literatures 1 to 3 that have been subjected to the above-mentioned spheroidization treatment are used, a problem of battery swelling may occur. Therefore, further improvements were required to improve the safety of secondary batteries.

SUMMARY OF INVENTION

An object of the present invention is to provide a carbon material that can improve the problem of battery swelling.

The present inventors have found that battery swelling can be reduced by using a carbon material containing natural graphite in which the relationship between the volume-average particle size (d50) of a carbon material measured by a laser diffraction method, and the ratio (d90/d10) of the particle size (d90) that is the 90% integrated part from the small particle side and the particle size (d10) that is the 10% integrated part from the small particle side satisfy a specific formula and the tap density is greater than or equal to a predetermined value. The present invention was completed based on such knowledge.

The reason why the carbon material of the present invention achieves the above effects is considered as follows.

By subjecting the carbon material of the present invention to spheroidization treatment, small particles fit into the interparticle gaps relatively large particles, making it possible to granulate dense particles. Since the spherical carbon material densified in this manner ensures a conductive path, it is possible to reduce battery swelling.

The gist of the present invention is as follows.

[1] A carbon material comprising natural graphite, wherein the carbon material satisfies the following formulas (1) and (2), $$y \geqq 0.23x + 3.1 \tag{1}$$

$$z \geqq 0.43 \tag{2}$$

wherein x is d50 (μm) of the carbon material, y is d90/d10 of the carbon material, and z is the tap density (g/cm$^3$).

[2] The carbon material according to [1], wherein d50 is 3.0 μm or more.

[3] The carbon material according to [1] or [2], wherein d50 is 20.0 μm or less.

[4] The carbon material according to any one of [1] to [3], the carbon material has an SA of 20.0 m$^2$/g or less.

[5] The carbon material according to any one of [1] to [4], wherein the carbon material has a flake-like, scale-like, or block-like shape.

[6] The carbon material according to any one of [1] to [5], wherein the carbon material has an average thickness of 3 μm or less.

[7] The carbon material according to any one of [1] to [6], wherein the carbon material has a $d_{002}$ value of 0.340 nm or less.

(The $d_{002}$ value is an interlayer distance of lattice planes (002 planes), which is determined by X-ray diffractometry in accordance with the method of the Japan Society for the Promotion of Science.)

[8] The carbon material according to any one of [1] to [7], wherein the carbon material is used as a material for a negative electrode material of a secondary battery.

[9] A method for producing a spherical carbon material, comprising a step of spheronizing the carbon material according to any one of [1] to [8].

[10] The method for producing a spherical carbon material according to [9], wherein the spherical carbon material is used as a negative electrode material of a secondary battery.

[11] A method for producing a composite carbon material, comprising a step of compounding a spherical carbon material obtained by the method according to [9] or [10] and a carbonaceous substance precursor.

[12] The method for producing a carbon material according to any one of [1] to [8], comprising a step of pulverizing a raw material of the carbon material.

[13] A method for manufacturing a secondary battery including a positive electrode, a negative electrode, and an electrolyte, the method comprising:

a step of forming a negative electrode active material layer containing a composite carbon material obtained by the method for producing a composite carbon material according to [11] on a current collector to obtain a negative electrode.

Advantageous Effects of Invention

According to the spherical carbon material produced using the carbon material of the present invention, battery swelling of secondary batteries can be suppressed.

BRIEF DESCRIPTION OF DRAWING

FIG. 1 is a graph showing a relationship between x (d50) and y (d90/d10) of the carbon materials listed in Table 1.

DESCRIPTION OF EMBODIMENTS

Hereinafter, the present invention will be explained in detail. The description of the constituent features of the invention described below is an example (representative example) of the embodiments of the present invention, and the present invention is not limited to these embodiments unless the gist thereof is exceeded.

<Carbon Material>

An embodiment of the present invention is a carbon material that contains natural graphite and satisfies the following formulas (1) and (2), and the carbon material is preferably used as a material for a negative electrode of a secondary battery.

$$y \geqq 0.23x + 3.1 \quad (1)$$

$$z \geqq 0.43 \quad (2)$$

wherein x is d50 (μm) of the carbon material, y is d90/d10 of the carbon material, and z is the tap density (g/cm$^3$).

In this specification, volume-average particle size (d50), the particle size (d10) corresponding to cumulative 10% from the small particle side of the particle size measured on a volume basis and the particle size (d90) corresponding to cumulative 90% from the small particle side of the particle size measured on a volume basis are values calculated from the volume-average particle size distribution measured by a laser diffraction method.

In this specification, tap density is determined by a method using a powder tester, wherein a cylindrical tap cell having a diameter of 5 cm and a volume capacity of 100 cm$^3$ is fully filled with a sample, the cell is tapped with a stroke length of 18 mm 500 times, the volume and mass of the sample are measured, and the density is calculated from them.

The spherical carbon material produced using a carbon material that contains natural graphite and satisfying the above formulas (1) and (2) can suppress battery swelling of a secondary battery for the reasons described above.

From the viewpoint of suppressing battery swelling of a secondary battery, the carbon material satisfying the above formula (1) preferably satisfies the following formula (1A), and more preferably satisfies the following formula (1B).

$$y \geqq 0.23x + 3.3 \quad (1A)$$

$$0.23x + 6.5 \geqq y \geqq 0.23x + 3.5 \quad (1B)$$

A carbon material that satisfies the above formulas (1) and (2) can be obtained by subjecting flake-like particles having a size of about d50=100 μm to fine pulverization and collecting the fine powder generated during pulverization without classifying.

As for the pulverization process, cyclic pulverization in which collision force, shearing force, and grinding force are applied repeatedly in a pulverizer is effective for generating fine powder, and tends to increase d90/d10 relative to d50.

The carbon material is typically graphite. Graphite is readily available commercially. Graphite has a theoretical high charge/discharge capacity of 372 mAh/g. Moreover, graphite is preferable because it has a greater effect of improving charge/discharge characteristics at high current density than other carbon materials.

As graphite, one with few impurities is preferable. Graphite can be used after being subjected to various known purification treatments, if necessary.

Types of graphite include natural graphite, artificial graphite, etc. In the present invention, a material containing at least natural graphite is used because it has high capacity and good charge/discharge characteristics at high current density.

Carbon materials can be used alone or in combination of two or more types. The proportion of natural graphite in the carbon material is preferably 80% by mass or more, particularly preferably 90% by mass or more, especially preferably 95 to 100% by mass based on 100% by mass of the carbon material in order to effectively obtain the above effects by using natural graphite.

(Physical Properties of Carbon Material)

•Particle Size d50 of Carbon Material

The volume-average particle size (d50) of the carbon material of this embodiment is usually 20.0 μm or less, preferably 16.0 μm or less, more preferably 14.0 μm or less, still more preferably 12.0 μm or less, particularly preferably 11.0 μm or less, and usually 3.0 μm or more, preferably 5.0 μm or more, more preferably 7.0 μm or more, still more preferably 8.0 μm or more, particularly preferably 10.0 μm or more.

When d50 is equal to or less than the above upper limit, streaks are less likely to occur during slurry application during electrode creation, and rapid charge/discharge characteristics and low-temperature input/output characteristics tend to improve. When d50 is equal to or greater than the above lower limit, it tends to be easier to prevent an increase in irreversible capacity and loss of initial battery capacity.

•Particle Size d10 of Carbon Material

The particle size (d10) corresponding to cumulative 10% from the small particle side of the particle size measured on a volume basis of the carbon material of this embodiment is usually 1.0 μm or more, preferably 1.5 μm or more, and more preferably 2.0 μm or more, still more preferably 2.5 μm or more, particularly preferably 3.0 μm or more, and usually 12.0 μm or less, preferably 10.0 μm or less, and more preferably 8.0 μm or less, still more preferably 6.0 μm or less, particularly preferably 4.0 μm or less.

When d10 is within the above range, the tendency of particles to agglomerate is not too strong, and it is possible to avoid problems in the process such as increase in slurry viscosity, decrease in electrode strength and decrease in initial charge/discharge efficiency in the secondary battery. When d10 is within the above range, deterioration in high current density charge/discharge characteristics and deterioration in output characteristics tend to be avoided.

•Particle Size d90 of Carbon Material

The particle size (d90) corresponding to cumulative 90% from the small particle side of the particle size measured on a volume basis of the carbon material of this embodiment is usually 50.0 μm or less, preferably 40.0 μm or less, more preferably 35.0 μm or less, still more preferably 30.0 μm or less, particularly preferably 25.0 μm or less, and usually 9.0 μm or more, preferably 13.0 μm or more, and more preferably 15.0 μm or more, still more preferably 18.0 μm or more, particularly preferably 20.0 μm or more.

When d90 is within the above range, a decrease in electrode strength and initial charge/discharge efficiency in the secondary battery can be avoided, process defects such as streaking during slurry application, and high current density charge/discharge characteristics can be avoided. There is also a tendency to avoid a decrease in output characteristics.

•d90/d10 of Carbon Material

The ratio (d90/d10) of the particle size (d90) corresponding to cumulative 90% from the small particle side to particle size (d10) corresponding to cumulative 10% from the small particle side of the particle size measured on a volume basis of the carbon material obtained in this embodiment is usually 5.6 or more, preferably 5.9 or more, more preferably 6.2 or more, and usually 20 or less, preferably 10 or less, more preferably 7 or less.

When d90/d10 is within the above range, the blistering resistance is excellent.

•Tap Density of Carbon Material

The tap density of the carbon material of this embodiment is usually 0.43 g/cm$^3$ or more, preferably 0.44 g/cm$^3$ or more, more preferably 0.45 g/cm$^3$ or more, and still more preferably 0.46 g/cm$^3$ or more, and usually 0.80 g/cm$^3$ or less, preferably 0.70 g/cm$^3$ or less, more preferably 0.60 g/cm$^3$ or less, still more preferably 0.55 g/cm$^3$ or less.

When the tap density is within the above range, spheroidization progresses efficiently, so the tap density of the spherical carbon material obtained after the spheronization treatment tends to be increased.

•Specific Surface Area (Hereinafter Sometimes Referred to as "SA") of Carbon Material Measured by BET Method The specific surface area (SA) of the carbon material of this embodiment by the BET method is usually 20.0 m$^2$/g or less, preferably 18.0 m$^2$/g or less, more preferably 16.0 m$^2$/g or less, still more preferably 14.0 m$^2$/g or less, particularly preferably 12.0 m$^2$/g or less, and usually 3.0 m$^2$/g or more, preferably 4.5 m$^2$/g or more, more preferably 6.0 m$^2$/g or more, still more preferably 7.5 m$^2$/g or more, particularly preferably 8.5 m$^2$/g or more.

When the specific surface area is within the above range, it becomes possible to obtain a spherical carbon material having high spheroidization efficiency, high tap density, and high SA. As a result, the number of insertion and desorption sites for lithium ions increases, so it tends to be possible to obtain a spherical carbon material with excellent low-temperature input/output characteristics.

In this specification, the specific surface area (SA) is a value measured by the BET method using nitrogen adsorption.

•Shape of Carbon Material

The particle shape of the carbon material of this embodiment is not particularly limited as long as it satisfies the above formulas (1) and (2), but is preferably flake-like, scale-like, or block-like, and more preferably flake-like shape.

Having the above shape, the particle contact area is large and the number of particle contact points can be increased, so it is possible to ensure a conductive path during electrode creation.

•Average Thickness of Carbon Material Particles

The average thickness of the particles of the carbon material of this embodiment is usually 3 μm or less, preferably 2 μm or less, more preferably 1 μm or less, and usually 0.01 μm or more, preferably 0.05 μm or more, more preferably 0.1 μm or more.

When the average thickness of the carbon material particles is within the above range, fine powder is likely to be generated during the spheronization process, and the resulting fine powder can be efficiently spheroidized while being rolled in, resulting in a dense and high tap density. It becomes possible to obtain a spherical carbon material. As a result, it tends to be possible to secure a conductive path, suppress electrodeposition, and obtain a spherical carbon material with reduced swelling.

In this specification, the average thickness of each type of particle is determined by observing the particle cross section using a scanning electron microscope (SEM), and determining the particle thickness corresponding to the length of 30 randomly selected particles in the direction perpendicular to the plane direction. The average thickness of 20 particles excluding 5 particles on the larger side and 5 particles on the smaller side is the calculated value.

If the plane direction of the particles is not determined, the particles may be oriented and then measured by observing the particle cross section using a scanning electron microscope (SEM).

The plane of a particle is the plane where the area created by the contour of the particle is the largest when the particle is observed from multiple directions. In the case of scale-like or flake-like carbon materials, the basal surface is a flat surface.

•$d_{002}$ Value of Carbon Material (X-Ray Parameter)

The $d_{002}$ value (interlayer distance) of the lattice planes (002 planes) of the carbon material of this embodiment, which is determined by X-ray diffractometry in accordance with the method of the Japan Society for the Promotion of Science, is preferably 0.330 nm or more, more preferably 0.332 nm or more, still more preferably 0.334 nm or more, and preferably 0.340 nm or less, more preferably 0.339 nm or less, still more preferably 0.338 nm or less.

When the $d_{002}$ value is within the above range, the crystallinity of the carbon material is moderately high, and an increase in irreversible capacity tends to be reduced.

In this specification, $d_{002}$ values are values determined by X-ray diffractometry in accordance with the method of the Japan Society for the Promotion of Science.

•Raman R Value of Carbon Material

The Raman R value of the carbon material of this embodiment is usually 0.05 or more, preferably 0.08 or more, more preferably 0.10 or more, and usually 0.50 or less, preferably 0.40 or less, more preferably 0.30 or less.

In this specification, Raman R value is defined as the intensity ratio (IB/IA) calculated by measuring the intensity IA of the peak PA that occurs around 1580 $cm^{-1}$ and the intensity IB of the peak PB that occurs around 1360 $cm^{-1}$ in a Raman spectrum obtained by Raman spectroscopy. Note that the expression "around 1580 $cm^{-1}$" refers to a range of 1580 to 1620 $cm^{-1}$, and the expression "around 1360 $cm^{-1}$" refers to a range of 1350 to 1370 $cm^{-1}$.

The Raman R value is an index representing the crystallinity near the surface of the carbon particle (up to about 100 Å from the particle surface), and the larger the Raman R value, the lower the crystallinity or the more disordered the crystal state.

When the Raman R value is within the above range, a structure having a low crystalline state is appropriately obtained on the surface of the carbon material, and lithium ions are easily intercalated and desorbed. Therefore, it is considered that good input/output characteristics can be obtained.

A Raman spectrum can be measured with a Raman spectrometer. Specifically, the particles that are to be measured are dropped into a measurement cell by gravity in order to charge the sample into the cell. The measurement is conducted while the inside of the measurement cell is irradiated with an argon ion laser beam and the measurement cell is rotated in a plane perpendicular to the laser beam.

<Method for Producing Carbon Material>

An example of a method for producing a carbon material that satisfies the above preferable characteristics is a method of pulverizing a carbon material that is a raw material (also referred to as a raw carbon material).

•Carbon Material as Raw Material

Examples of the carbon material used as a raw material include carbon materials such as natural graphite and artificial graphite, and the like. At least natural graphite is used in the present invention because it suppresses electrode plate swelling and improves process compatibility.

Natural graphite is classified into flake-like graphite (Flake Graphite), scale-like graphite (Crystalline Graphite), bloke-like graphite (Vein Graphite), and arthy graphite (Amorphous Graphite) on the basis of their properties (see the chapter "Graphite" of "Encyclopedia of powder process industry and technology" (published by Sangyo Gijyutsu Center K.K., Showa 49 (1974)) and "HANDBOOK OF CARBON, GRAPHITE, DIAMOND AND FULLERENES" (published by Noyes Publications)). The degree of graphitization is highest for scale-like graphite and block-like graphite at 100%, followed by flake-like graphite at 99.9%. A material with a high degree of graphitization is suitable for this embodiment. As natural graphite, one with few impurities is particularly preferable. Natural graphite can be used after being subjected to various known purification treatments, if necessary.

Natural graphite is produced in Madagascar, China, Brazil, Ukraine, Canada, etc. The production area of scale-like graphite is Sri Lanka. The main sources of arthy graphite are the Korean peninsula, China, Mexico, etc.

Artificial graphite can be obtained by graphitizing a raw material containing a large amount of easily graphitizable carbon at a temperature of 2500° C. or higher and 3200° C. or lower. During calcination, a silicon-containing compound, a boron-containing compound, or the like can also be used as a graphitization catalyst.

Easily graphitizable carbon includes, for example, coal-based heavy oil such as coal tar pitch, carbonized liquefied oil, and the like; straight-run heavy oil such as atmospheric residual oil, vacuum residual oil, and the like; petroleum-based heavy oils such as ethylene tar and other cracked heavy oils that are byproducts of the thermal cracking of crude oil, naphtha, and the like; petroleum-based pitches; aromatic hydrocarbons such as acenaphthylene, decacyclene, anthracene, and the like; nitrogen-containing cyclic compounds such as phenazine, acridine, and the like; sulfur-containing cyclic compounds such as thiophene, and the like; aliphatic cyclic compounds such as adamantane, and the like; polyphenylenes such as biphenyl, terphenyl, and the like; polyvinyl esters such as polyvinyl chloride, polyvinyl acetate, polyvinyl butyral, and the like; and thermoplastic polymers such as polyvinyl alcohol, and the like.

As mentioned above, since it is possible to obtain a carbon material having high capacity and good charge/discharge characteristics at high current density, the raw carbon material preferably contains natural graphite in an amount of 80% by mass or more, particularly preferably 90% by mass or more, and especially preferably 95 to 100% by mass.

•Pulverizing Process

The device used for pulverization is preferably a fine pulverizer because it is necessary to reduce the particle size of the carbon powder. In particular, it is preferable to apply not only collision force but also shearing force or grinding force to pulverize the particles because the shape of the particles after pulverizing becomes more circular, which improves filling properties and provides in a high tap density. Further, it is preferable to carry out cyclic pulverization in a fine pulverizer so that collision force, shearing force, and grinding force are repeatedly applied to the particles because fine powder can be generated, a high tap density can be achieved, and the ratio of d90/d10 to d50 can be increased.

Examples of the fine pulverizer include a mechanical type pulverizer, pneumatic type pulverizer, swirl type flow pulverizer, and the like. Specifically, a ball mill, a vibration mill, a pin mill, a stirring mill, a jet mill, a cyclone mill, a turbo mill, a cryptoron, and the like can be used. In particular, it is preferable to use a swirl flow type pulverizer, since d90/d10 becomes larger with respect to d50.

When treating a raw carbon material using the above device, the circumferential speed of the rotating rotor is usually 30 m/s or more, preferably 75 m/s or more, more preferably 100 m/s or more, even more preferably 110 m/s or more, particularly preferably 120 m/s or more, and preferably 200 m/s or less.

It is preferable that the circumferential speed of the rotor is within the above range because an appropriate spherical carbon material can be obtained from the obtained carbon material.

The pulverization process is preferably performed by circulating or retaining the raw carbon material in the pulverizing device. When processing by circulating or retaining in the device, the flow rate of the suction blower used for discharging from the pulverize is usually 10 m/s or more, preferably 20 m/s or more, and more preferably 25 m/s or more. It is usually 100 m/s or less, preferably 80 m/s or less, and more preferably 60 m/s or less.

When the flow rate of the suction blower is within the above range, it is possible to achieve both the size of d90/d10 relative to d50 and productivity.

The pulverization treatment can be carried out, for example, in an air atmosphere, an oxidizing atmosphere, or an inert atmosphere such as carbon dioxide, nitrogen, or argon. Among these, since fine pores are generated due to oxidation of the surface of the carbon material and SA increases, it is preferable to perform the treatment in an air atmosphere or an oxidizing atmosphere.

•Classification Processing

In order to satisfy the above formulas (1) and (2), it is preferable that the carbon material is not subjected to classification treatment.

•Highly Purifying Treatment

When producing the carbon material of this embodiment, treatment for high purification may be performed. Examples of a method for highly purifying the carbon material include a method of performing acid treatment using an acidic solution containing nitric acid or hydrochloric acid. This method is preferable because impurities such as metals, metal compounds, and inorganic compounds in the carbon material can be removed without introducing sulfate, which can become a highly active sulfur source, into the system.

The above acid treatment may use an acid containing nitric acid and/or hydrochloric acid. Examples of other acid include inorganic acid such as bromic acid, hydrofluoric acid, boric acid, iodic acid, and the like or mixed acids mixed with organic acids such as citric acid, formic acid, acetic acid, oxalic acid, trichloroacetic acid, trifluoroacetic acid, and the like.

The acid used in the acid treatment is preferably concentrated hydrofluoric acid, concentrated nitric acid, or concentrated hydrochloric acid, and more preferably concentrated nitric acid or concentrated hydrochloric acid.

In this embodiment, the carbon material may be treated with sulfuric acid, but it should be used in an amount and concentration that does not impair the effects and physical properties of this embodiment.

When using a plurality of acids, for example, a combination of hydrofluoric acid, nitric acid, and hydrochloric acid is preferable because the above impurities can be efficiently removed. When a plurality of acids are used, the minimum mixing ratio of the mixed acids is usually at least 10% by mass, preferably at least 20% by mass, and more preferably at least 25% by mass. The upper limit is the value obtained by mixing all in equal amounts (expressed as 100% by mass/type of acid).

The acid treatment is performed, for example, by immersing the carbon material in an acidic solution as described above.

The amount of acidic solution used for immersion is usually 100:10 or more, preferably 100:20 or more, and more preferably 100:30 or more, in terms of the ratio (mass ratio) of carbon material to acidic solution. It is usually 100:1000 or less, preferably 100:500 or less, more preferably 100:300 or less. When the amount of acidic solution used is 100:10 or more, the above impurities tend to be efficiently removed. When the amount of acidic solution used is 100:1000 or less, the amount of carbon material that can be washed at one time increases, making it possible to improve productivity and reduce costs at the same time.

The immersion time is usually 0.5 to 48 hours, preferably 1 to 40 hours, more preferably 2 to 30 hours, and even more preferably 3 to 24 hours. When the immersion time is equal to or less than the above upper limit, both productivity improvement and cost reduction can be achieved. When the immersion time is equal to or longer than the lower limit, the impurities tend to be efficiently removed.

The immersion temperature is usually 25° C. or higher, preferably 40° C. or higher, more preferably 50° C. or higher, and still more preferably 60° C. or higher. When using an aqueous acid, the theoretical upper limit of the immersion temperature is 100° C., which is the boiling point of water. When the immersion temperature is within the above range, the above impurities tend to be efficiently removed.

It is preferable to wash the carbon material after the acid treatment with water in order to remove residual acid content and raise the pH from weakly acidic to a neutral range. When the pH of the carbon material after acid treatment (treated carbon material) is usually 3 or more, preferably 3.5 or more, more preferably 4 or more, still more preferably 4.5 or more, water washing can be omitted. When the pH of the carbon material after acid treatment is less than the above upper limit, it is preferable to wash with water as necessary. As the washing water, it is preferable to use ion-exchanged water or distilled water from the viewpoint of improving washing efficiency and preventing contamination with impurities.

The specific resistance of the washing water at 25° C., which is an indicator of the amount of ions in the water, is usually 0.1 MΩ·cm or more, preferably 1 MΩ·cm or more, and more preferably 10 MΩ·cm or more. The theoretical upper limit of the specific resistance of the washing water is 18.24 MΩ·cm. The specific resistance of the washing water being equal to or higher than the lower limit value indicates that the amount of ions in the water is small, which is preferable from the viewpoint of suppressing contamination with impurities and improving washing efficiency.

Water washing can be performed, for example, by stirring and mixing the treated carbon material and water.

The mixing ratio (mass ratio) of the treated carbon material and water in water washing is usually 100:10 or more, preferably 100:30 or more, more preferably 100:50 or more, and still more preferably 100:100 or more. It is usually 100:1000 or less, preferably 100:700 or less, more preferably 100:500 or less, and still more preferably 100:400 or less. Production efficiency tends to improve when the mixing ratio of treated carbon material and water is 100:1000 or less. When the mixing ratio of treated carbon material and water is 100:10 or more, the effect of reducing residual impurities and acid content tends to be excellent.

The stirring temperature (temperature of the washing water) is usually 25° C. or higher, preferably 40° C. or higher, more preferably 50° C. or higher, and still more preferably 60° C. or higher. The upper limit of the stirring temperature is 100° C., which is the boiling point of water. When the stirring temperature is equal to or higher than the above lower limit, the effect of reducing residual impurities and acid content tends to be excellent.

The stirring time is usually 0.5 to 48 hours, preferably 1 to 40 hours, more preferably 2 to 30 hours, and even more preferably 3 to 24 hours. When the stirring time is equal to or less than the above upper limit, production efficiency tends to improve. When the stirring time is at least the above lower limit, the effect of reducing residual impurities and acid content tends to be excellent.

When water washing is performed in a batch manner, it is preferable to repeat the stirring-filtration process in the washing water multiple times from the viewpoint of removing impurities and acid components. Water washing may be repeated so that the pH of the treated carbon material is usually 3 or higher, preferably 3.5 or higher, more preferably 4 or higher, and still more preferably 4.5 or higher. Usually, water washing is carried out once or more, preferably twice or more, and more preferably three times or more.

The wastewater hydrogen ion concentration of the carbon material obtained by acid treatment and further water washing if necessary is usually 200 ppm or less, preferably 100 ppm or less, more preferably 50 ppm or less, and still more preferably 30 ppm. It is usually 1 ppm or more, preferably 2 ppm or more, more preferably 3 ppm or more, and still more preferably 4 ppm or more. When the wastewater hydrogen ion concentration is equal to or lower than the above upper limit, acid content tends to be removed and a decrease in pH is suppressed. When the wastewater hydrogen ion concentration is equal to or higher than the above lower limit, processing time can be shortened, which tends to lead to improved productivity.

•Process of Heat Treating Carbon Material

When producing the carbon material of this embodiment, heat treatment may be performed to adjust the amount of unstable carbon and crystallinity of the carbon material. When performing the above-mentioned pulverization treatment, the amount of unstable carbon on the surface of the carbon material particles may increase too much, so by performing heat treatment, the amount of unstable carbon can be appropriately reduced.

The temperature condition during the heat treatment in this case may be set according to the desired degree of crystallinity, and is usually 300° C. or higher, preferably 500° C. or higher, more preferably 700° C. or higher, and still more preferably 800° C. or higher. The temperature is usually 2000° C. or lower, preferably 1500° C. or lower, and more preferably 1200° C. or lower. Under the above temperature condition, the crystallinity of the carbon material particle surface can be appropriately increased.

Even when a carbon material having low crystallinity is contained as a raw carbon material, the crystallinity can be increased by graphitizing the carbon material having low crystallinity by heat treatment for the purpose of increasing the discharge capacity.

The temperature conditions during the heat treatment in this case may be set according to the desired degree of crystallinity, and are usually 600° C. or higher, preferably 900° C. or higher, more preferably 1600° C. or higher, and still more preferably 2500° C. or higher. The temperature is usually 3200° C. or lower, and preferably 3100° C. or lower. Under the above temperature conditions, the crystallinity of the carbon material particle surface can be improved.

Crystals on the surface of carbon material particles may be disordered, and when the above-mentioned pulverization treatment is applied, the disorder becomes particularly noticeable. By performing the heat treatment, disordered crystals on the surface of the carbon material particles can be repaired.

When performing heat treatment, the holding time for maintaining the temperature conditions within the above range is usually 10 seconds or more and usually 72 hours or less.

The heat treatment is performed under an inert gas atmosphere such as nitrogen gas or under a non-oxidizing atmosphere using gas generated from the raw carbon material.

Examples of the heat treatment apparatus include a shuttle furnace, a tunnel furnace, an electric furnace, a lead hammer furnace, a rotary kiln, a direct current furnace, an Acheson furnace, a resistance heating furnace, an induction heating furnace, and the like.

<Method for Producing Spherical Carbon Material>

One embodiment of the present invention is a method for producing a spherical carbon material, in which a carbon material according to an embodiment of the present invention is subjected to a spheroidization treatment to form a spherical carbon material (hereinafter referred to as "the spherical carbon material of the present embodiment".).

•Circularity of Spherical Carbon Material

The circularity of the spherical carbon material of the present embodiment is usually 0.85 or more, preferably 0.90 or more.

The circularity may be determined by measuring a particle size distribution in terms of equivalent circle diameter with a flow system particle image analyzer and calculating the average circularity. Circularity is defined by the following formula (3). When particles have a circularity of 1, the particles are theoretically perfect spherical.

$$[\text{Circularity}] = [\text{Perimeter of equivalent circle having same area as projected shape of particle}] / [\text{Actual perimeter of projected shape of particle}] \quad (3)$$

In the measurement of circularity, ion-exchange water is used as a disperse medium, and polyoxyethylene (20) monolaurate is used as a surfactant. Equivalent circle diameter is the diameter of a circle (equivalent circle) having the same projected area as a particle image. Circularity is the ratio calculated using the perimeter of the equivalent circle as numerator and the perimeter of the projected particle image as denominator. The average of the circularities of particles having an equivalent diameter of 3 μm to 40 μm is used as circularity.

•Spheroidization Treatment

A known method can be used for the spheroidization process.

Examples of the spheroidization method include a method using a device that repeatedly applies mechanical effects such as compression, friction, and shear force, mainly impact force but also particle interaction, to the particles.

Specifically, it is preferable to use an apparatus capable of repeatedly applying a mechanical action that is primarily an impact force as well as a compressive force, a frictional force, a shear force, and the like due to the interaction between the particles and the like, to the particles.

Specifically, an apparatus that includes a rotor provided with a number of blades disposed inside the casing and performs a surface treatment by rotating the rotor at a high speed and thereby applying a mechanical action, such as an impact, compressive, frictional, or shear force, to the carbon material introduced into the inside thereof is preferable.

The apparatus preferably has a mechanism that causes the carbon material particles to circulate and allows the mechanical action to be repeatedly applied to the carbon material particles.

Specific examples of such an apparatus include "Hybridization System" (produced by Nara Machinery Co., Ltd.), "KRYPTRON", "KRYPTRON Orb" (produced by Earth Technica Co., Ltd.), "CF Mill" (produced by Ube Industries, Ltd.), "MECHANO FUSION System", "NOBILTA", "FAC- ULTY" (produced by Hosokawa Micron Corporation), "Theta Composer" (produced by TOKUJU Co., LTD.), and "COMPOSI" (produced by NIPPON COKE & ENGINEERING CO., Ltd.). Among these, "Hybridization System" produced by Nara Machinery Co., Ltd. is preferable.

When performing the spheroidization treatment using the above-mentioned apparatus, the peripheral speed of the rotating rotor is usually 30 to 100 m/sec, preferably 40 to 100 m/sec, and more preferably 50 to 100 m/sec.

The spheroidization treatment can be carried out by simply passing the carbon material through the apparatus. But it is preferable to process the carbon material by circulating or staying in the apparatus for 30 seconds or more, and it is more preferable to process the carbon material by circulating or staying in the apparatus for 1 minute or more.

•Granulating Agent

The spheronization treatment may be performed in the presence of a granulating agent. By using a granulating agent, the adhesion force between the carbon materials increases, and it becomes possible to produce a spherical carbon material to which the carbon materials are more firmly adhered.

The granulating agent used in this embodiment preferably does not contain an organic solvent. When the granulating agent contains an organic solvent, it is preferable that at least one of the organic solvents does not have a flash point. When the granulating agent has a flash point, it is preferable that the flash point is 5° C. or higher. As a result, when granulating carbon materials in the next process, it is possible to prevent the risk of ignition, fire, and explosion of organic compounds induced by impact and heat generation, and to ensure stable and efficient production.

In this specification, the flash point can be measured by a known method.

Examples of granulating agents include coal tar, petroleum heavy oil, paraffinic oils such as liquid paraffin, synthetic oils such as olefinic oils, naphthenic oils, and aromatic oils; natural oils such as vegetable oils and fats, animal fats, esters, and higher alcohols; organic compounds such as resin binder solutions in which a resin binder is dissolved in an organic solvent having a flash point of 5° C. or higher, preferably 21° C. or higher; aqueous solvents such as water; and mixtures thereof, and the like.

Examples of organic solvents having a flash point of 5° C. or higher include aromatic hydrocarbons such as alkylbenzenes such as xylene, isopropylbenzene, ethylbenzene, propylbenzene, and the like, alkylnaphthalenes such as methylnaphthalene, ethylnaphthalene, propylnaphthalene, and the like, allylbenzenes such as styrene, and the like and allylnaphthalene, and the like; aliphatic hydrocarbons such as octane, nonane, decane, and the like; ketones such as methylisobutyl ketone, diisobutyl ketone, cyclohexanone, and the like; esters such as propyl acetate, butyl acetate, isobutyl acetate, amyl acetate, and the like; alcohols such as methanol, ethanol, propanol, butanol, isopropyl alcohol, isobutyl alcohol, ethylene glycol, propylene glycol, diethylene glycol, triethylene glycol, tetraethylene glycol, glycerin, and the like; glycol derivatives such as ethylene glycol monomethyl ether, ethylene glycol monoethyl ether, ethylene glycol monobutyl ether, diethylene glycol monobutyl ether, triethylene glycol monobutyl ether, tetraethylene glycol monobutyl ether, methoxypropanol, methoxypropyl-2-acetate, methoxymethylbutanol, methoxybutyl acetate, diethylene glycol dimethyl ether, dipropylene glycol dimethyl ether, diethylene glycol ethyl methyl ether, triethylene glycol dimethyl ether, tripropylene glycol dimethyl ether, tetraethylene glycol dimethyl ether, ethylene glycol monophenyl ether, and the like; ethers such as 1,4-dioxane, and the like; nitrogen-containing compounds such as dimethylformamide, pyridine, 2-pyrrolidone, N-methyl-2-pyrrolidone, and the like; sulfur-containing compounds such as dimethyl sulfoxide, and the like; halogen-containing compounds such as dichloromethane, chloroform, carbon tetrachloride, dichloroethane, trichloroethane, chlorobenzene, and the like; mixtures thereof; and the like. For example, substances having a low flash point such as toluene are not included.

These organic solvents can also be used alone as a granulating agent.

Examples of the resin binder include cellulose resin binders such as ethyl cellulose, methyl cellulose, salts thereof, and the like; acrylic resin binders such as polymethyl acrylate, polyethyl acrylate, polybutyl acrylate, polyacrylic acid, salts thereof, and the like; methacrylic resin binders such as polymethyl methacrylate, polyethyl methacrylate, polybutyl methacrylate, and the like; phenolic resin binders, and the like.

Among the granulating agents, coal tar, heavy petroleum oil, paraffinic oils such as liquid paraffin, alcohols, and aromatic oils are preferred because they can produce spherical carbon materials having high circularity and less fine powder.

The granulating agent is preferably one that can be efficiently removed and does not adversely affect battery characteristics such as capacity, output characteristics, storage and cycle characteristics. Specifically, a material of which mass decreases by usually 50% or more, preferably 80% or more, more preferably 95% or more, even more preferably 99% or more, and particularly preferably 99.9% or more when heated to 700° C. in an inert atmosphere can be appropriately selected.

Examples of a methods for mixing the carbon material and granulating agent include a method of mixing the carbon material and granulating agent using a mixer or kneader, and a method of mixing the granulating agent made by dissolving an organic compound in a low-viscosity diluting solvent (organic solvent) and the carbon material and removing the diluting solvent (organic solvent) after the mixing. In addition, when spheronizing the carbon material, there is also a method in which the granulating agent and carbon material are charged into a granulating device, and the process of mixing the carbon material and granulating agent and the spheronizing process are performed at the same time.

The amount of the granulating agent is usually 0.1 parts by mass or more, preferably 1 part by mass or more, more preferably 3 parts by mass or more, and even more preferably 6 parts by mass or more, and particularly preferably 10 parts by mass or more based on 100 parts by mass of the carbon material. It is usually 1000 parts by mass or less, preferably 100 parts by mass or less, more preferably 80 parts by mass or less, even more preferably 50 parts by mass or less, and particularly preferably 20 parts by mass or less. When the amount of the granulating agent is within the above range, the adhesion between particles is increased, the degree of circularity is increased, and problems such as decreased productivity due to adhesion of carbon material to the device are less likely to occur.

When using a granulating agent when producing the spherical carbon material of this embodiment, a step of removing the granulating agent may be included. Examples of a method for removing the granulating agent include a method of washing with a solvent, and a method of volatilizing and decomposing the granulating agent by heat treatment.

When the granulating agent is volatilized and decomposed by heat treatment, the heat treatment temperature is usually 60° C. or higher, preferably 100° C. or higher, more preferably 200° C. or higher, still more preferably 300° C. or higher, and particularly preferably 500° C. or higher. The temperature is usually 1500° C. or lower, preferably 1000° C. or lower, and more preferably 800° C. or lower. When the heat treatment temperature is within the above range, the granulating agent can be sufficiently volatilized and decomposed to be removed and productivity can be improved.

The heat treatment time is usually 0.5 to 48 hours, preferably 1 to 40 hours, more preferably 2 to 30 hours, and even more preferably 3 to 24 hours. When the heat treatment time is within the above range, the granulating agent can be sufficiently volatilized and decomposed to be removed and productivity can be improved.

The atmosphere for the heat treatment may be an active atmosphere such as an air atmosphere, or an inert atmosphere such as a nitrogen atmosphere or an argon atmosphere. In the case of heat treatment at 200 to 300° C., there are no particular restrictions on the atmosphere of the heat treatment. When the heat treatment is performed at 300° C. or higher, the atmosphere for the heat treatment is preferably an inert atmosphere such as a nitrogen atmosphere or an argon atmosphere, from the viewpoint of preventing oxidation of the graphite surface.

•Pressure Treatment

After obtaining the spherical carbon material, it is preferable to include a step of pressurizing the spherical carbon material. Examples of a method for pressurizing spherical carbon materials include isotropic pressurization using hydrostatic pressure using water as the pressurizing medium, and isotropic pressurization using pneumatic pressure using gas as the pressurizing medium. Alternatively, it may be a step of filling a mold with the spherical carbon material and applying pressure in a fixed direction using a uniaxial press.

The pressure of the pressurizing medium in the above-mentioned pressurizing treatment is usually 50 to 4000 kgf/cm$^2$, preferably 300 to 3500 kgf/cm$^2$, and more preferably 500 to 3000 kgf/cm$^2$. When the pressure of the pressurizing medium is equal to or higher than the above lower limit, the pore volume can be reduced to a smaller range. When the pressure of the pressurizing medium is equal to or lower than the above upper limit, an increase in the specific surface area tends to be easily suppressed.

<Method for Producing Composite Carbon Material>

One embodiment of the present invention is a method for producing a composite carbon material, in which the spherical carbon material of the present embodiment obtained by the method for producing a spherical carbon material, which is an embodiment of the present invention, is composited with a carbonaceous substance precursor to obtain a composite carbon material.

The composite carbon material in which the spherical carbon material of this embodiment and the carbonaceous substance are combined can suppress side reactions with the electrolyte, improve rapid charging and discharging properties, and suppress battery swelling of secondary batteries.

The carbonaceous substance used here preferably has lower crystallinity than the carbon material that is an embodiment of the present invention.

Examples of a method for obtaining the composite carbon material include a method of mixing the spherical carbon material of this embodiment with a carbonaceous substance precursor, and a method of vapor-depositing a carbonaceous substance precursor on the spherical carbon material of this embodiment. Preferable methods include a method of mixing the spherical carbon material of this embodiment and a carbonaceous substance precursor and heating it in a non-oxidizing atmosphere (referred to as a mixing method in this embodiment), and a method of vapor-depositing a carbonaceous substance precursor on the spherical carbon material of this embodiment in an inert gas atmosphere (referred to as a vapor phase method in this embodiment).

•Mixing Method

In the mixing method, it is preferable to mix the spherical carbon material of this embodiment with an organic compound that is a carbonaceous substance precursor and heat the mixture in a non-oxidizing atmosphere.

Examples of an organic compounds that is a carbonaceous substance precursor include carbon-based heavy oils such as soft or hard coal tar pitch, coal tar, coal liquefied oil, and the like; petroleum-based heavy oil such as ordinary pressure or vacuum distillation residue oil of crude oil, and the like; cracked heavy oil that is a byproduct of ethylene production through naphtha cracking; petroleum pitch, and the like.

Examples of an organic compound that is a resin-derived carbonaceous substance precursor include thermosetting resins such as phenol resin, polyacrylonitrile, polyimide, and the like; thermoplastic resins such as polyvinyl chloride, polyvinylidene chloride, polyvinyl alcohol, and the like; natural polymers such as celluloses, starch, polysaccharides, and the like.

Coal-based raw material oil may be, for example, coal-based heavy oils such as coal tar pitch, impregnated pitch, molded pitch, and coal liquefied oil produced using coal as a raw material, and refined coal tar from which insoluble components in coal tar pitch have been removed. Coal-based raw material oil contains many flat aromatic hydrocarbons, such as dibenzocoronene and pentacene, in which many benzene rings are bonded. When the temperature of the aromatic hydrocarbon having a flat plate structure increases and the fluidity thereof increases during the calcination process, the surfaces of the aromatic hydrocarbons having a flat plate structure tend to overlap each other, and due to the thermal polycondensation reaction, the reaction proceeds in a state where the flat plate structures overlap. For this reason, the van der Waals force that acts between the planes of hydrocarbons that have become polymerized through polycondensation becomes stronger, the distance between the planes of the hydrocarbons that have become polymers tends to become smaller, and the degree of crystallization increases.

Examples of petroleum-based raw material oils include distillation residue oil of heavy oil, naphtha cracking residue oil, catalytic cracking heavy oil, and the like. Examples thereof further include heat-treated pitches such as ethylene tar pitch, FCC decant oil, and Ashland pitch, obtained by heat-treating cracked heavy oil. Petroleum-based raw material oils also contain flat aromatic hydrocarbons in which many benzene rings are bonded. However, petroleum-based raw material oils also contain many linear paraffinic hydrocarbons. In addition, although the aromatic hydrocarbons contained in petroleum-based raw material oils are flat aromatic hydrocarbons in which many benzene rings are bonded, not a few of them have side chains such as methyl groups to the benzene rings, and not a few of the benzene rings are substituted with a cyclohexane ring. Therefore, when the temperature rises during the calcination process, whereby fluidity increases and the planes of the aromatic hydrocarbon having a flat plate structure start overlapping, the presence of many linear paraffins on that plane tends to prevent the overlap. Further, plate-shaped aromatic hydrocarbons having a side chain such as a methyl group tend to interfere with the overlapping of the plate-shaped aromatic hydrocarbons. Furthermore, the cycloxane ring also tends to inhibit the overlapping of aromatic hydrocarbons, but the cycloxane ring is decomposed by heat and becomes a side chain such as a methyl group, which further tends to inhibit the overlapping. For these reasons, petroleum-based raw material oils tend to have a smaller degree of crystallization than coal-based raw material oils. For this reason, petroleum-based raw material oil is preferable as the organic compound serving as the carbonaceous substance precursor used in this embodiment.

Specifically, since an amorphous phase with a small degree of crystallization can be obtained, it is preferable to use heavy oils generated during petroleum refining and a pitch produced by heat-treating petroleum heavy oil as carbonaceous substance precursors.

Furthermore, the organic compound serving as the carbonaceous substance precursor of this embodiment may be one obtained by adding a petroleum-based raw material oil, a resin-derived organic compound, or another solvent to a coal-based raw material oil.

Usually, these coal-based raw material oils contain light oil components, so in order to extract useful components and increase productivity, it is preferable to perform a distillation operation and refine them before use.

The residual carbon rate of the organic compound that is the carbonaceous substance precursor is usually 1% or more, preferably 10% or more, more preferably 20% or more, still more preferably 30% or more, and usually 99% or less, preferably 90% or less, more preferably 80% or less, still more preferably 70% or less. When the residual carbon rate is within the above range, the carbonaceous substance precursor can be uniformly diffused and permeated into the surface of the spherical carbon material and inside the micropores, and the input/output characteristics tend to improve.

The residual coal rate is measured by a method based on JIS 2270.

The carbonaceous substance precursor can be diluted by adding a solvent or the like. By adding a solvent or the like, the viscosity of the carbonaceous substance precursor can be lowered, and the carbonaceous substance precursor tends to diffuse and permeate more uniformly onto the surface of the spherical carbon material and into the micropores.

In an embodiment of a method of mixing the spherical carbon material and the carbonaceous substance precursor of this embodiment, the spherical carbon material and the carbonaceous substance precursor are mixed using a mixer or a kneader, and the spherical carbon material is mixed with the carbonaceous substance precursor whereby obtaining a mixture wherein the carbonaceous substance precursor is attached to the spherical carbon material.

Raw materials such as the spherical carbon material, the carbonaceous substance precursor, and an optional solvent are mixed under heating if necessary.

•Gas Phase Method

Examples of the vapor phase method include a CVD (Chemical Vapor Deposition) method in which a vapor phase coating raw material compound, which is a carbonaceous substance precursor, is uniformly deposited on the spherical carbon material of this embodiment in an inert gas atmosphere.

Examples of the gas-phase coating raw material compound include gaseous compounds that can be decomposed by heat or plasma to form a carbonaceous substance film on the surface of the spherical carbon material. Examples of gaseous compounds include unsaturated aliphatic hydrocarbons such as ethylene, acetylene, and propylene; saturated aliphatic hydrocarbons such as methane, ethane, and propane; and aromatic hydrocarbons such as benzene, toluene, and naphthalene. These gaseous compounds may be used alone or as a mixed gas of two or more.

The temperature, pressure, time, etc. for performing the CVD treatment can be appropriately selected depending on the type of coating raw material used and the desired amount of coated carbonaceous substance.

•Other Processing

After the spherical carbon material of this embodiment is composited with a carbonaceous substance by the above-mentioned mixing method or gas phase method, it can be subjected to crushing and/or pulverization treatment. Further, other steps or control conditions not described above may be added as long as the effects of this embodiment are not impaired.

•Content of Carbonaceous Substances in Composite Carbon Material

The content of carbonaceous substances in the composite carbon material of this embodiment is usually 0.01% by mass or more, preferably 0.1% by mass or more, and more preferably 1.0% by mass based on 100% by mass of the composite carbon material, and usually 20.0% by mass or less, preferably 15.0% by mass or less, and more preferably 12.0% by mass or less.

When the content of carbonaceous substances in the composite carbon material is equal to or below the above upper limit, material failure of the composite carbon material is unlikely to occur when rolling is performed with sufficient pressure to achieve high capacity in a secondary battery, whereby it tends to be possible to suppress an increase in irreversible charge/discharge capacity during the initial cycle, and to suppress a decrease in initial efficiency. When the content of the carbonaceous substance in the composite carbon material is equal to or higher than the above lower limit value, the effect of the carbonaceous substance tends to be easily obtained.

The content of carbonaceous substances in the composite carbon material is calculated from the mass before and after calcining the material, as shown in equation (4) below. The calculation is performed assuming that there is no change in the mass of the spherical carbon material before and after calcining.

$$\text{Content of carbonaceous substance (mass \%)} = \{(w_2 - w_1)/w_2\} \times 100 \quad (4)$$

($w_1$ is the mass (kg) of the spherical carbon material, and $w_2$ is the mass (kg) of the composite carbon material.)

(Physical Properties of Composite Carbon Material)

•Particle Size d50 of Composite Carbon Material

The volume-average particle size (d50) of the composite carbon material obtained in this embodiment is usually 50.0 μm or less, preferably 40.0 μm or less, more preferably 25.0 μm or less, usually 5.0 μm or more, preferably 8.0 μm or more, more preferably 10.0 μm or more.

When d50 is equal to or below the above upper limit, streaks are less likely to occur during slurry application in the preparing process of an electrode and rapid charge/discharge characteristics and low-temperature input/output characteristics tend to improve. When d50 is equal to or greater than the above lower limit value, it tends to be easier to prevent an increase in irreversible capacity and loss of initial battery capacity.

•Particle Size d10 of Composite Carbon Material

The particle size (d10) corresponding to cumulative 10% from the small particle side of the particle size measured on a volume basis of the composite carbon material obtained in this embodiment is usually 3.0 μm or more, preferably 4.0 μm or more, more preferably 5.0 μm or more, and usually 30.0 μm or less, preferably 20.0 μm or less, more preferably 15.0 μm or less.

When d10 is within the above range, the tendency of particles to agglomerate is not too strong, and it is possible to avoid problems in the process such as increase in slurry viscosity, decrease in electrode strength and decrease in initial charge/discharge efficiency in the secondary battery. Further, there is a tendency that deterioration in high current density charge/discharge characteristics and deterioration in output characteristics can be avoided.

•Particle Size d90 of Composite Carbon Material

The particle size (d90) corresponding to cumulative 90% from the small particle side of the particle size measured on a volume basis of the composite carbon material obtained in this embodiment is usually 70.0 μm or less, preferably 50.0 μm or less, more preferably 40.0 μm or less, and usually 10.0 μm or more, preferably 15.0 μm or more, more preferably 20.0 μm or more.

When d90 is within the above range, a decrease in electrode strength and initial charge/discharge efficiency in the secondary battery can be avoided, process defects such as streaking during slurry application, and high current density charge/discharge characteristics can be avoided. There is also a tendency to avoid a decrease in high current density charge/discharge characteristics and a decrease in output characteristics.

•d90/d10 of Composite Carbon Material

The particle size (d90) corresponds to 90% cumulatively from the small particle side and the particle size (d10) corresponds to 10% cumulatively from the small particle side of the particle size measured on a volume basis of the composite carbon material obtained in this embodiment. The ratio (d90/d10) is usually 1.5 or more, preferably 2.0 or more, more preferably 2.5 or more, still more preferably 3.0 or more, and usually 5.0 or less, preferably 4.5 or less, more preferably 4.0 or less, still more preferably 3.5 or less.

When d90/d10 is within the above range, the blistering resistance is excellent.

•Tap Density of Composite Carbon Material

The tap density of the composite carbon material obtained in this embodiment is usually 0.50 g/cm$^3$ or more, preferably 0.80 g/cm$^3$ or more, more preferably 1.00 g/cm$^3$ or more, and usually 2.00 g/cm$^3$ or less, preferably 1.60 g/cm$^3$ or less, more preferably 1.40 g/cm$^3$ or less.

When the tap density is within the above range, high-speed charging and discharging characteristics and productivity will be good.

•Specific Surface Area (SA) Measured by BET Method of Composite Carbon Material

The specific surface area (SA) of the composite carbon material obtained in this embodiment by the BET method is usually 10.0 m$^2$/g or less, preferably 5.0 m$^2$/g or less, more preferably 3.0 m$^2$/g or less, and usually 0.1 m$^2$/g or more, preferably 0.5 m$^2$/g or more, more preferably 1.0 m$^2$/g or more.

When the specific surface area is within the above range, high-speed charging and discharging characteristics and productivity will be good.

•Circularity of Composite Carbon Material

The circularity of the composite carbon material obtained in this embodiment is usually 0.85 or more, preferably 0.90 or more.

<Method for Producing Secondary Batteries>

One embodiment of the present invention is a method for producing a secondary battery including a positive electrode, a negative electrode, and an electrolyte. The method includes a step of obtaining a negative electrode by forming a negative electrode active material layer containing the composite carbon material on a current collector. The composite carbon material is obtained by the method for producing a composite carbon material according to an embodiment of the present invention.

(Negative Electrode Active Material Layer)

The negative electrode active material layer may be mixed with a carbon material different from the composite carbon material in order to improve the orientation of the electrode plate, the permeability of the electrolyte, the conductive path, etc., and to improve the cycle characteristics and swelling of the electrode plate.

Examples of the carbon material different from the composite carbon materials include natural graphite, artificial graphite, amorphous carbon, and carbon materials containing metal particles or metal compounds. These carbon materials may be used alone or in any combination of two or more.

Examples of natural graphite include highly purified natural graphite. High purification usually involves dissolving and removing ash and metals contained in low-purity natural graphite by treating it in an acid such as hydrochloric acid, sulfuric acid, nitric acid, or hydrofluoric acid, or by combining multiple acid treatment steps. Usually, after the acid treatment step, a water washing treatment or the like is performed to remove the used acid. Further, instead of the acid treatment step, ash, metals, etc. may be evaporated and removed by treatment at a high temperature of 2000° C. or higher. Furthermore, ash, metals, and the like may be removed by processing in a halogen gas atmosphere such as chlorine gas during high-temperature heat treatment. These methods may be used in any combination.

The volume-average particle size (d50) of natural graphite is usually 5 μm or more, preferably 8 μm or more, more preferably 10 μm or more, and usually 60 μm or less, preferably 40 μm or less, more preferably 30 μm or less. When the volume-average particle size is within this range, high-speed charging/discharging characteristics and productivity are improved.

The specific surface area (SA) of natural graphite measured by the BET method is usually 1 m$^2$/g or more, preferably 2 m$^2$/g or more, and usually 30 m$^2$/g or less, preferably 15 m$^2$/g or less. When the specific surface area is within this range, high-speed charging and discharging characteristics and productivity are improved.

The tap density of natural graphite is usually 0.4 g/cm$^3$ or more, preferably 0.6 g/cm$^3$ or more, more preferably 0.8 g/cm$^3$ or more, and usually 1.3 g/cm$^3$ or less, preferably 1.2 g/cm$^3$ or less, more preferably 1.1 g/cm$^3$ or less. When the tap density is within this range, high-speed charging/discharging characteristics and productivity will are improved.

Examples of artificial graphite include particles obtained by calcining and graphitizing a single graphite precursor particle in powder form, and granulated particles obtained by shaping, calcining, graphitizing, and crushing a plurality of graphite precursor particles.

The volume-average particle size (d50) of artificial graphite is usually 5 μm or more, preferably 10 μm or more, and usually 60 μm or less, preferably 40 μm or less, more preferably 30 μm or less. When the volume-average particle size is within this range, electrode plate swelling is suppressed and productivity is improved.

The specific surface area (SA) of artificial graphite measured by the BET method is usually 0.5 $m^2/g$ or more, preferably 1.0 $m^2/g$ or more, and usually 8 $m^2/g$ or less, preferably 6 $m^2/g$ or less, more preferably 4 $m^2/g$ or less. When the specific surface area is within this range, electrode plate swelling is suppressed and productivity is improved.

The tap density of artificial graphite is usually 0.6 $g/cm^3$ or more, preferably 0.7 $g/cm^3$, more preferably 0.8 $g/cm^3$, and usually 1.5 $g/cm^3$ or less, preferably 1.4 $g/cm^3$ or less, more preferably 1.3 $g/cm^3$ or less. When the tap density is within this range, electrode plate swelling is suppressed and productivity is improved.

Examples of the amorphous carbon include particles obtained by calcining a bulk mesophase and particles obtained by treating a graphitizable organic compound to make it infusible and calcining it.

The volume-average particle size (d50) of amorphous carbon is usually 5 μm or more, preferably 12 μm or more, and usually 60 μm or less, preferably 40 μm or less. When the volume-average particle size is within this range, high-speed charging/discharging characteristics and productivity are improved.

The specific surface area (SA) of amorphous carbon measured by the BET method is usually 1 $m^2/g$ or more, preferably 2 $m^2/g$ or more, more preferably 2.5 $m^2/g$ or more, and usually 8 $m^2/g$ or less, preferably 6 $m^2/g$ or less, more preferably 4 $m^2/g$ or less. When the specific surface area is within this range, high-speed charging and discharging characteristics and productivity are improved.

The tap density of amorphous carbon is usually 0.6 $g/cm^3$ or more, preferably 0.7 $g/cm^3$ or more, more preferably 0.8 $g/cm^3$ or more, and usually 1.3 $g/cm^3$ or less, preferably 1.2 $g/cm^3$ or less, more preferably 1.1 $g/cm^3$ or less. When the tap density is within this range, high-speed charging/discharging characteristics and productivity are improved.

Examples of carbon materials containing metal particles or metal compounds include a composite material of graphite composited with at least one metal selected from the group consisting of Fe, Co, Sb, Bi, Pb, Ni, Ag, Si, Sn, Al, Zr, Cr, P, S, V, Mn, Nb, Mo, Cu, Zn, Ge, In, and Ti, or a compound thereof. As the metal, an alloy consisting of two or more metals may be used. Among these, metals or compounds thereof selected from the group consisting of Si, Sn, As, Sb, Al, Zn, and W are preferred, and Si and $SiO_x$ are more preferred.

$SiO_x$ is obtained from silicon dioxide ($SiO_2$) and metal silicon (Si) as raw materials. The value of x is usually $0<x<2$, preferably 0.2 or more, more preferably 0.4 or more, still more preferably 0.6 or more, and preferably 1.8 or less, more preferably 1.6 or less, still more preferably 1.4 or less. When x is within this range, it is possible to achieve high capacity and at the same time reduce irreversible capacity due to the bond between lithium and oxygen.

The volume-average particle size (d50) of the metal particles is usually 0.005 μm or more, preferably 0.01 μm or more, more preferably 0.02 μm or more, still more preferably 0.03 μm or more, and usually 10 μm or less, preferably 9 μm or less, and more preferably 8 μm or less. When the volume-average particle size is within this range, volumetric expansion accompanying charging and discharging is reduced, and good cycle characteristics can be obtained while maintaining charging and discharging capacity.

The specific surface area (SA) of the metal particles measured by the BET method is usually 0.5 $m^2/g$ or more, preferably 1 $m^2/g$ or more, and usually 120 $m^2/g$ or less, preferably 100 $m^2/g$ or less. When the specific surface area is within this range, the charging/discharging efficiency and discharge capacity of the secondary battery are high, lithium can be taken in and out quickly during high-speed charging and discharging, and the rate characteristics are excellent.

It is preferable that the negative electrode active material layer contains a binder.

Examples of the binder include those having an olefinic unsaturated bond in the molecule. Specific examples include styrene-butadiene rubber, styrene-isoprene-styrene rubber, acrylonitrile-butadiene rubber, butadiene rubber, and ethylene-propylene-diene copolymer. By using a binder having an olefinic unsaturated bond in the molecule, the swelling property of the negative electrode active material layer with respect to the electrolytic solution can be reduced. Among them, styrene-butadiene rubber is preferred because of its easy availability.

The negative electrode active material layer of this embodiment is formed by dispersing a composite carbon material and a binder in a dispersion medium to form a slurry, and applying the slurry to a current collector.

Examples of the dispersion medium include organic solvents such as alcohol, and water.

A conductive agent may be further added to this slurry. Examples of the conductive agent include carbon black such as acetylene black, Ketjen black, and furnace black, and fine powder made of Cu, Ni, or an alloy thereof.

Examples of the current collector include metal thin films such as rolled copper foil, electrolytic copper foil, and stainless steel foil.

The thickness of the current collector is preferably 4 μm or more, more preferably 6 μm or more, and preferably 30 μm or less, more preferably 20 μm or less.

The drying temperature after applying the slurry onto the current collector is preferably 60° C. or higher, more preferably 80° C. or higher, and preferably 200° C. or lower, more preferably 195° C. or lower. The drying atmosphere after applying the slurry onto the current collector is preferably air or an inert atmosphere.

The thickness of the negative electrode active material layer is preferably 5 μm or more, more preferably 20 μm or more, even more preferably 30 μm or more, and preferably 200 μm or less, more preferably 100 μm or less, even more preferably 75 μm or less. When the thickness of the negative electrode active material layer is within the above range, a negative electrode has excellent practicality and can obtain sufficient lithium intercalation and desorption functions for high-density current values.

(Cathode Active Material Layer)

The positive electrode is one in which a positive electrode active material layer containing a positive electrode active material and a binder is formed on a current collector.

Examples of the positive electrode active material include metal chalcogen compounds that can occlude and release alkali metal cations such as lithium ions during charging and discharging. Examples of metal chalcogen compounds include transition metal oxides such as vanadium oxide, molybdenum oxide, manganese oxide, chromium oxide, titanium oxide, tungsten oxide, transition metal sulfides such as vanadium sulfide, molybdenum sulfide, titanium sulfide and CuS; phosphorus-sulfur compounds of transition metals such as $NiPS_3$ and $FePS_3$; selenium compounds of transition metals such as $VSe_2$ and $NbSe_3$; composite oxides of transition metals such as $Fe_{0.25}V_{0.75}S_2$, $Na_{0.1}CrS_2$; composite sulfides of transition metals such as $LiCoS_2$ and $LiNiS_2$.

Among these, $V_2O_5$, $V_5O_{13}$, $VO_2$, $Cr_2O_5$, $MnO_2$, $TiO_2$, $MoV_2O_8$, $LiCoO_2$, $LiNiO_2$, $LiMn_2O_4$, $TiS_2$, $V_2S_5$, $Cr_{0.25}V_{0.75}S_2$, and $Cr_{0.5}V_{0.5}S_2$ are preferable, and $LiCoO_2$, $LiNiO_2$, $LiMn_2O_4$, and lithium transition metal composite oxides in which a part of these transition metals is replaced with other metals are more preferable. These positive electrode active materials may be used alone or in combination.

Examples of the binder that binds the positive electrode active material include inorganic compounds such as silicates and water glass; resins without unsaturated bonds such as Teflon (registered trademark) and polyvinylidene fluoride. Among these, resins without unsaturated bonds are preferred because they can suppress decomposition during oxidation reactions. The weight average molecular weight of the resin without unsaturated bonds is usually 10,000 or more, preferably 100,000 or more, and usually 3,000,000 or less, preferably 1,000,000 or less.

The positive electrode active material layer may contain a conductive agent in order to improve the conductivity of the electrode. Examples of the conductive agent include carbon powders such as acetylene black, carbon black, and graphite; fibers, powders, and foils of a metal.

The positive electrode is formed by slurrying the positive electrode active material and binder with a dispersion medium, coating it on the current collector, and drying it using the same method as preparation of the negative electrode.

Examples of the current collector of the positive electrode include aluminum, nickel, and stainless steel (SUS).

(Electrolytes)

The electrolyte is preferably a non-aqueous electrolyte, such as a non-aqueous electrolyte in which a lithium salt is dissolved in a non-aqueous solvent, or a non-aqueous electrolyte made into a gel, rubber, or solid sheet form using an organic polymer compound.

Examples of the non-aqueous solvent used in the non-aqueous electrolyte include chain carbonates such as diethyl carbonate, dimethyl carbonate, and ethyl methyl carbonate; cyclic carbonates such as ethylene carbonate, propylene carbonate, and butylene carbonate; chain ethers such as 1,2-dimethoxyethane; cyclic ethers such as tetrahydrofuran, 2-methyltetrahydrofuran, sulfolane, and 1,3-dioxolane; chain esters such as methyl formate, methyl acetate, and methyl propionate; cyclic esters such as γ-butyrolactone, and γ-valerolactone.

These non-aqueous solvents may be used alone or in combination of two or more. In the case of a mixed solvent, a combination of a mixed solvent containing a cyclic carbonate and a chain carbonate is preferable, and the cyclic carbonate is preferably a mixed solvent of ethylene carbonate and propylene carbonate, which can exhibit high ionic conductivity even at low temperatures and is suitable for low-temperature charging load characteristics.

Examples of lithium salts used in the nonaqueous electrolyte include halides such as LiCl and LiBr; perhalogenates such as $LiClO_4$, $LiBrO_4$, and $LiClO_4$; inorganic lithium salts such as inorganic fluoride salts such as $LiPF_6$, $LiBF_4$, and $LiAsF_6$; perfluoroalkanesulfonic acid salts such as $LiCF_3SO_3$ and $LiC_4F_9SO_3$; and fluorine-containing organic lithium salts such as perfluoroalkanesulfonic acid imide salts such as Li trifluorosulfonimide ($(CF_3SO_2)_2NLi$). Among these, $LiClO_4$, $LiPF_6$, and $LiBF_4$ are preferred.

The lithium salts may be used alone or in combination of two or more.

The concentration of lithium salt in the non-aqueous electrolyte is usually 0.5 mol/L or more and usually 2.0 mol/L or less.

Examples of the organic polymer compound in a gel-like, rubber-like, or solid sheet-like non-aqueous electrolytic solution made of an organic polymer compound include polyether-based polymer compounds such as polyethylene oxide and polypropylene oxide; crosslinked polymers of polyether-based polymer compounds; vinyl alcohol polymer compounds such as polyvinyl alcohol and polyvinyl butyral; insolubilized products of vinyl alcohol polymer compounds; polyepichlorohydrin; polyphosphazene; polysiloxane; vinyl polymer compounds such as polyvinyl pyrrolidone, polyvinylidene carbonate, poly acrylonitrile; copolymerized polymers such as poly(ω-methoxyoligooxyethylene methacrylate), poly(ω-methoxyoligooxyethylene methacrylate-co-methyl methacrylate), and poly(hexafluoropropylene-vinylidene fluoride).

The electrolyte may further contain a film forming agent.

Examples of the film forming agent include carbonate compound such as vinylene carbonate, vinyl ethyl carbonate, and methylphenyl carbonate; alkenesulfide such as ethylene sulfide and propylene sulfide; sultone compound such as 1,3-propane sultone and 1,4-butane sultone; acid anhydride such as maleic anhydride and succinic anhydride.

The electrolyte may further contain an overcharge inhibitor such as diphenyl ether and cyclohexylbenzene.

(Separator)

A porous separator such as a porous membrane or non-woven fabric is usually interposed between the positive electrode and the negative electrode to prevent short circuits between the electrodes. In this case, the porous separator is impregnated with the electrolyte. Examples of the material for the separator include polyolefin such as polyethylene and polypropylene; and polyether sulfone. Preferably it is a polyolefin.

(Secondary Battery)

The type of the secondary battery of this embodiment is not particularly limited, and examples thereof include a cylinder type having a sheet electrode and a separator in a spiral shape; a cylinder type having an inside-out structure in which a pellet electrode and a separator are combined; a coin type having a stacked pellet electrode and a separator.

By housing these types of batteries in an exterior case, they can be used in any desired shape, such as a coin shape, a cylindrical shape, or a square shape.

The procedure for assembling the secondary battery of this embodiment is also not particularly limited, and may be assembled using an appropriate procedure depending on the structure of the battery. For example, it is assembled by a method in which a negative electrode is placed on an exterior case, an electrolyte and a separator are provided thereon, a positive electrode is further placed so as to face the negative electrode, and the negative electrode is caulked together with a gasket and a sealing plate to form a battery.

When producing a negative electrode by forming the negative electrode active material layer described above, there are no particular restrictions on the method or selection of other materials. Furthermore, when producing a secondary battery using this negative electrode, there are no particular restrictions on the method or selection of components necessary for battery construction, such as the positive electrode and electrolyte.

A secondary battery using a spherical carbon material made from the carbon material of this embodiment that contains natural graphite and satisfies formulas (1) and (2) above as a negative electrode material can be suppressed in battery swelling due to the reasons described above. Therefore, the negative electrode material using the carbon material of this embodiment can be suitably used for secondary batteries such as lithium ion secondary batteries.

Example

Specific embodiments of the present invention will be explained in more detail with reference to Examples. The invention is not limited to these examples.

<d50·d90·d10>

The d50, d90, and d10 of the carbon materials obtained in Examples 1 to 6 and Comparative Examples 1 to 4, and the composite carbon materials obtained in Examples 7 to 9 and Comparative Examples 5 to 6 were calculated from the measured volume-based particle size distribution determined by laser diffraction method.

Specifically, 0.01 g of the carbon material or composite carbon material was suspended in about 150 mL of a 0.1 volume % aqueous solution of polyoxyethylene (20) sorbitan monolaurate (Tween 20 (registered trademark)), which is a surfactant. This was introduced as a measurement sample into a laser diffraction/scattering particle size distribution measuring device (HORIBA's "LA-920"). After irradiating the measurement sample with ultrasonic waves at an intensity of 4 for 1 minute, the volume-based particle size distribution was measured by the measuring device, and volume-based d50, d90, and d10 were calculated therefrom.

<Specific Surface Area (SA) Measured by BET Method>

The specific surface area (SA) of the carbon materials obtained in Examples 1 to 6 and Comparative Examples 1 to 4 and the composite carbon materials obtained in Examples 7 to 9 and Comparative Examples 5 to 6 was measured by the BET method using a specific surface area measuring device ("Gemini 2360" produced by Shimadzu Corporation). The measurement sample was pre-dried at 350° C. for 15 minutes under nitrogen flow, then cooled to liquid nitrogen temperature, and the SA was measured by a nitrogen adsorption BET 6-point method using a gas flow method under conditions of relative pressure of nitrogen to atmospheric pressure of 0.05 to 0.31.

<Tap Density>

Using a powder tester (Hosokawa Micron "PT-S"), the carbon materials obtained in Examples 1 to 6 and Comparative Examples 1 to 4, and the composite carbon materials obtained in Examples 7 to 9 and Comparative Examples 5 to 6 were tested. The carbon material was dropped into a cylindrical tap cell with a diameter of 5 cm and a volumetric capacity of 100 $cm^3$ through a sieve with an opening of 1.7 mm, so that the cell was completely filled. Further, tapping with a stroke length of 18 mm was performed 500 times. The volume and the mass of the sample was measured, and as the tapped density was calculated from them.

<$d_{002}$>

$d_{002}$ of the carbon materials obtained in Examples 1 to 6 and Comparative Examples 1 to 4 was determined by X-ray diffraction in accordance with the method of the Japan Society for the Promotion of Science.

Specifically, the measurement sample was prepared by mixing a carbon material with approximately 15% by mass of X-ray standard high-purity silicon powder based on the total amount of the carbon material. The radiation source of the CuKα radiation made monochromatic with a graphite monochromator. A wide-angle X-ray diffraction curve was measured according to a reflection type diffractometer method, and the interplanar distance ($d_{002}$) was calculated in accordance with the method of the Japan Society for the Promotion of Science.

<Average Thickness of Particles>

The average thickness of the carbon material particles obtained in Examples 1 to 6 and Comparative Examples 1 to 4 was calculated by observing the particle cross section using a scanning electron microscope (SEM).

Specifically, we measured the length of 30 randomly selected particles in a direction perpendicular to the plane (basal plane) direction in a particle cross-sectional image observed by a scanning electron microscope (SEM). The average value of the thickness of 20 particles excluding each of smaller 5 particles and larger 5 particles was calculated, and it was used as the average thickness of the particles. Note that the average thickness "<1 μm" means that the average thickness is less than 1 μm and 0.01 μm or more.

<Circularity>

The circularity of the carbon materials obtained in Examples 1 to 6 and Comparative Examples 1 to 4, and the composite carbon materials obtained in Examples 7 to 9 and Comparative Examples 5 to 6 was measured using a flow type particle image analyzer. The average circularity was determined by measuring the particle size distribution using the equivalent circular diameter. Circularity is defined by the following equation (3).

[Circularity]=[Perimeter of an equivalent circle with the same area as the particle projection shape]/[Actual perimeter of the particle projection shape] (3)

In this circularity measurement, ion-exchanged water was used as a dispersion medium, and polyoxyethylene (20) monolaurate was used as a surfactant. Equivalent circle diameter is the diameter of a circle (equivalent circle) that has the same projected area as the captured particle image. Circularity is the ratio of the numerator of the perimeter of an equivalent circle and the denominator of the actual perimeter of the particle projection shape. The circularity of the measured particles having an equivalent diameter in the range of 3 μm to 40 μm was averaged, and the averaged value was taken as the circularity.

<Swelling>

60.60±0.12 g (0.60±0.12 g in terms of solid content) of a 1% by mass carboxymethylcellulose sodium salt aqueous solution and 1.237±0.012 g (0.6 g in terms of solid content) of a styrene-butadiene rubber aqueous dispersion having a weight average molecular weight of 270,000 were added to 60.00±0.06 g of the composite carbon materials obtained in Examples 7 to 9 and Comparative Examples 5 to 6. They were stirred for 5 minutes with a Keyence hybrid mixer, and defoamed for 30 seconds. Thus, a slurry was obtained.

This slurry was applied on a copper foil having a thickness of 10 μm as a current collector to a width of 5 cm using a small die coater so that the solid amount was 10.00±0.2 $mg/cm^2$. Roll pressing was performed using a roller to adjust the density of the negative electrode active material layer to 1.50±0.03 $g/cm^3$ to obtain a negative electrode sheet (the thickness of this negative electrode sheet is designated as H).

The obtained negative electrode sheet, NMC (nickel/manganese/cobalt) positive electrode sheet, and polyethylene separator were laminated in the order of negative electrode, separator, and positive electrode. The battery element thus obtained was wrapped in an aluminum laminate film. $LiPF_6$ was dissolved at a concentration of 1 mol/L in a mixed solvent of ethylene carbonate (EC) and dimethyl carbonate (DMC) (volume ratio=3:7) to prepare an electrolyte. After injecting the electrolyte into the element, it was sealed in vacuum to produce a sheet-shaped non-aqueous secondary battery.

The produced battery, which had not been charged or discharged, was restrained under a confining pressure of 80 kPa in an atmosphere of 25° C. and placed on a horizontal surface. Using a laser displacement meter ("CL-3000" produced by Keyence Corporation), a laser was irradiated from the top surface of the restraining jig to measure the amount of change in the thickness of the battery due to charging and discharging. The battery was used for 2 cycles at a voltage range of 4.1V to 3.0V and a current value of 0.1 C (1 C is the current value for discharging the rated capacity in 1 hour based on the discharge capacity at a 1 hour rate), and in a voltage range of 4.0V. Two cycles of initial charging and discharging were performed at 2V to 3.0V and a current value of 0.2 C.

Following the initial charging and discharging, 25 cycles were repeated at a voltage range of 4.2V to 3.0V and a current value of 0.5 C, and the amount of change in the thickness of the battery during cycling was measured. Assuming that the thickness change in the discharge state after the initial charge and discharge is d(0) and the thickness change in the discharge state after 25 cycles as d(25), the battery swelling δ is calculated using the following formula (5).

$$\delta(\%) = [d(25) - d(0)]/H \times 100 \tag{5}$$

(H is the thickness of the negative electrode sheet after roll pressing and before electrolyte injection.)

Example 1

Scale-like natural graphite with d50=100 μm, thickness <10 μm, $d_{002}$=0.336 nm, and Raman value=0.17 was placed in a dry swirl flow type pulverizer having pulverizing blades and an airflow classification mechanism inside the pulverizing chamber. The rotation speed of the pulverizing blades was adjusted to 126 m/s at the circumferential speed, and the flow rate of the suction blower at the outlet of the pulverized was adjusted to 48 m/s. Then, the particles were cyclically pulverized by collision, shearing, and attrition between the particles, between the particles and the crushing blades, and between the particles and the root gastric wall of the pulverizing chamber in an atmospheric environment, and the pulverized powder was collected using a bag filter so as not to remove fine powder, thereby obtaining a scaly carbon material. Table 1 shows the physical properties of the obtained carbon material.

Example 2

A carbon material was obtained in the same manner as in Example 1, except that the flow velocity of the suction blower of the dry swirl flow type pulverizer was set to 44 m/s. Table 1 shows the physical properties of the obtained carbon material.

Example 3

A carbon material was obtained in the same manner as in Example 1, except that the flow velocity of the suction blower of the dry swirl flow type pulverizer was set to 40 m/s. Table 1 shows the physical properties of the obtained carbon material.

Example 4

A carbon material was obtained in the same manner as in Example 1, except that the flow rate of the suction blower of the dry swirl flow type pulverizer was set to 35 m/s. Table 1 shows the physical properties of the obtained carbon material.

Example 5

A carbon material was obtained in the same manner as in Example 1, except that the flow rate of the suction blower of the dry swirl flow type pulverizer was set to 31 m/s. Table 1 shows the physical properties of the obtained carbon material.

Example 6

A carbon material was obtained in the same manner as in Example 1, except that the flow velocity of the suction blower of the dry swirl flow type pulverizer was set to 26 m/s. Table 1 shows the physical properties of the obtained carbon material.

Comparative Example 1

Scale-like natural graphite with d50=100 μm, thickness <10 μm, $d_{002}$=0.336 nm, and Raman value=0.17 was placed in a dry swirl flow type pulverizer having pulverizing blades and an airflow classification mechanism inside the pulverizing chamber. The rotation speed of the pulverizing blade was adjusted to 115 m/s at the circumferential speed, and the flow rate of the suction blower at the outlet of the pulverized was adjusted to 36 m/s. Then, the particles were cyclically pulverized by collision, shearing, and attrition between the particles, between the particles and the crushing blades, and between the particles and the root gastric wall of the pulverizing chamber in an atmospheric environment, and the pulverized powder was collected using a cyclone so that the fine powder was classified, thereby obtaining a carbon material. Table 1 shows the physical properties of the obtained carbon material.

Comparative Example 2

A carbon material was obtained in the same manner as in Comparative Example 1, except that the flow velocity of the suction blower of the dry swirl flow type pulverizer was set to 34 m/s. Table 1 shows the physical properties of the obtained carbon material.

Comparative Example 3

UF8 produced by AMG Mining was used as it was as the carbon material. Table 1 shows the physical properties of the carbon material used.

Comparative Example 4

A carbon material was obtained by pulverizing flaky natural graphite having d50=100 μm, thickness <10 μm, $d_{002}$=3.36 Å, and Raman value=0.17 using a collision plate jet mill. Table 1 shows the physical properties of the obtained carbon material.

Example 7

100 parts by mass of the carbon material obtained in Example 3 and 12 parts by mass of liquid oil as a granulating agent were mixed, and a spheroidization treatment was performed. After that, the liquid oil used as a granulating agent was removed by heat treatment. Thus, a spherical carbon material was obtained.

The obtained spherical carbon material was filled and sealed in a rubber container, subjected to isotropic pressure treatment, and then the obtained molded product was crushed and classified.

The obtained powder was mixed with pitch containing 0.02% by mass of ash, 20 ppm by mass of metal impurities, and 1% by mass of quinoline insoluble matter as a carbonaceous substance precursor. The mixture was subjected to reduced pressure treatment to 10 Torr or less. After that, the pressure was restored to atmospheric pressure with nitrogen, and then subjected to heat treatment in a furnace. The oxygen concentration in the furnace was made to be less than 100 ppm by flowing nitrogen. The heat treatment was conducted in an inert gas at 700° C. for 1 hour, and then at 1000° C. for 1 hour. By crushing and classifying the obtained calcined product, a composite carbon material containing an amorphous carbonaceous substance on the surface of the spherical carbon material was obtained. From the calcining yield, the mass ratio of spherical carbon material to amorphous carbonaceous substance (spherical carbon material:amorphous carbonaceous substance) in the composite carbon material obtained was 1:0.08 (the carbonaceous substance content in the composite carbon material was 7.4% by mass). Table 2 shows the physical properties of the obtained composite carbon material.

Example 8

A composite carbon material was obtained in the same manner as in Example 7, except that the carbon material obtained in Example 4 was used. Table 2 shows the physical properties of the obtained composite carbon material.

Example 9

A composite carbon material was obtained in the same manner as in Example 7, except that the carbon material obtained in Example 5 was used. Table 2 shows the physical properties of the obtained composite carbon material.

Comparative Example 5

A composite carbon material was obtained in the same manner as in Example 7, except that the carbon material obtained in Comparative Example 1 was used. Table 2 shows the physical properties of the obtained composite carbon material.

Comparative Example 6

A composite carbon material was obtained in the same manner as in Example 7, except that the carbon material obtained in Comparative Example 2 was used. Table 2 shows the physical properties of the obtained composite carbon material.

Comparative Example 7

Spheronizing treatment was attempted in the same manner as in Example 7, except that the carbon material obtained in Comparative Example 4 was used, but it was not possible to obtain a spherical carbon material due to the low tap density.

TABLE 1

| | d50 [μm] | d90 [μm] | d10 [μm] | d90/d10 [—] | y | 0.23x + 3.1 | SA [$m^2$/g] | Tap Density [g/$cm^3$] | $d_{002}$ [nm] | Average Thickness [μm] | Circularity [—] |
|---|---|---|---|---|---|---|---|---|---|---|---|
| Example 1 | 13.4 | 31.7 | 4.4 | 7.2 | 7.2 | 6.2 | 8.3 | 0.49 | 0.336 | <1 | 0.87 |
| Example 2 | 11.5 | 25.0 | 3.9 | 6.4 | 6.4 | 5.7 | 9.0 | 0.48 | 0.336 | <1 | 0.87 |
| Example 3 | 10.9 | 23.5 | 3.7 | 6.4 | 6.3 | 5.6 | 9.6 | 0.48 | 0.336 | <1 | 0.87 |
| Example 4 | 10.6 | 24.1 | 3.5 | 6.9 | 6.8 | 5.5 | 10.4 | 0.46 | 0.336 | <1 | 0.87 |
| Example 5 | 10.1 | 22.4 | 3.4 | 6.6 | 6.6 | 5.4 | 10.8 | 0.47 | 0.336 | <1 | 0.87 |
| Example 6 | 8.8 | 18.5 | 3.1 | 6.0 | 5.9 | 5.1 | 12.2 | 0.45 | 0.336 | <1 | 0.87 |
| Comparative Example 1 | 11.6 | 23.2 | 4.2 | 5.5 | 5.5 | 5.8 | 9.7 | 0.51 | 0.336 | <1 | 0.87 |
| Comparative Example 2 | 11.0 | 21.7 | 4.0 | 5.4 | 5.4 | 5.6 | 10.4 | 0.50 | 0.336 | <1 | 0.87 |
| Comparative Example 3 | 8.2 | 14.9 | 3.2 | 4.7 | 4.7 | 5.0 | 12.5 | 0.40 | 0.336 | <1 | 0.88 |
| Comparative Example 4 | 5.7 | 10.9 | 2.6 | 4.2 | 4.2 | 4.4 | 13.9 | 0.29 | 0.336 | <1 | 0.87 |

TABLE 2

| | Type of Carbon Material | Spheronizing | d50 [μm] | d90 [μm] | d10 [μm] | d90/d10 [—] | SA [$m^2$/g] | Tap Density [g/$cm^3$] | Circularity [—] | Swelling [%] |
|---|---|---|---|---|---|---|---|---|---|---|
| Example 7 | Example 3 | Possible | 16.7 | 29.7 | 9.6 | 3.1 | 1.6 | 1.22 | 0.91 | 3.8 |
| Example 8 | Example 4 | Possible | 16.5 | 29.6 | 9.4 | 3.1 | 1.8 | 1.22 | 0.91 | 3.5 |
| Example 9 | Example 5 | Possible | 15.7 | 29.0 | 9.0 | 3.2 | 2.0 | 1.22 | 0.91 | 4.0 |
| Comparative Example 5 | Comparative Example 1 | Possible | 16.7 | 29.1 | 9.9 | 2.9 | 1.9 | 1.24 | 0.91 | 5.1 |
| Comparative Example 6 | Comparative Example 2 | Possible | 16.1 | 27.8 | 9.6 | 2.9 | 1.9 | 1.23 | 0.91 | 4.9 |
| Comparative Example 7 | Comparative Example 4 | Impossible | — | — | — | — | — | — | — | — |

As can be seen from Tables 1 and 2, the composite carbon materials of Examples 7 to 9, which were obtained using carbon materials containing natural graphite and satisfying formulas (1) and (2) above, suppressed battery swelling. On the other hand, the composite carbon materials of Comparative Examples 5 and 6 obtained using carbon materials that did not satisfy the above formula (1) were unable to suppress battery swelling.

This is because in the carbon material of this embodiment, small particles fit into the gaps between relatively large particles, making it possible to granulate dense particles. It is considered that the dense particles have a conductive path, so that the battery swelling is be suppressed.

Comparative Example 7 is an example in which a carbon material with a low tap density was used. Due to the low tap density, it was not possible to produce a spherical carbon material.

Although the present invention has been described in detail using specific embodiments, it will be apparent to those skilled in the art that various changes can be made without departing from the spirit and scope of the present invention.

This application is based on Japanese Patent Application No. 2021-148060 filed on Sep. 10, 2021, and the entire of which is incorporated herein by reference.

INDUSTRIAL APPLICABILITY

A secondary battery using a carbon material containing natural graphite and satisfying the above formulas (1) and (2) as a negative electrode material can suppress battery swelling. Therefore, the carbon material of this embodiment can be suitably used as a material for a negative electrode of a secondary battery, typified by a lithium ion secondary battery.

The invention claimed is:

1. A carbon material, comprising:

natural graphite, wherein the carbon material satisfies the following formulas (1) and (2), $$y \geqq 0.23x + 3.1 \quad (1)$$

$$z \geqq 0.43 \quad (2)$$

wherein x is a d50 (μm) of the carbon material, y is a d90/d10 of the carbon material, and z is a tap density (g/cm$^3$).

2. The carbon material according to claim 1, wherein the d50 is 3.0 μm or more.

3. The carbon material according to claim 1, wherein the d50 is 20.0 μm or less.

4. The carbon material according to claim 1, wherein the carbon material has an SA of 20.0 m$^2$/g or less.

5. The carbon material according to claim 1, wherein the carbon material has a flake-like, scalelike, or block-like shape.

6. The carbon material according to claim 1, wherein the carbon material has an average thickness of 3 μm or less.

7. The carbon material according to claim 1, wherein the carbon material has a d002 value of 0.340 nm or less, and wherein the d002 value is an interlayer distance of lattice planes (002 planes), which is determined by X-ray diffractometry in accordance with the method of the Japan Society for the Promotion of Science.

8. A secondary battery, comprising:

a negative electrode material comprising the carbon material of claim 1.

9. A method for producing a spherical carbon material, comprising:

spheronizing the carbon material of claim 1.

10. The method for producing a spherical carbon material according to claim 9, wherein the spherical carbon material is used as a negative electrode material of a secondary battery.

11. A method for producing a composite carbon material, comprising:

compounding the spherical carbon material obtained by the method according to claim 9 and a carbonaceous substance precursor.

12. A method for producing the carbon material according to claim 1, comprising:

pulverizing a raw material of the carbon material.

13. A method for manufacturing a secondary battery comprising a positive electrode, a negative electrode, and an electrolyte, the method comprising:

forming a negative electrode active material layer comprising the composite carbon material obtained by the method for producing a composite carbon material according to claim 11 on a current collector to obtain a negative electrode.

* * * * *